Jan. 21, 1969 H. SCHLÜTER ET AL 3,423,537

REED SWITCHING NETWORK FOR EXTENDING A TRANSMISSION THROUGH A MATRIX

Filed Aug. 25, 1964 Sheet 2 of 2

United States Patent Office 3,423,537
Patented Jan. 21, 1969

3,423,537

REED SWITCHING NETWORK FOR EXTENDING A TRANSMISSION LINE THROUGH A MATRIX

Heinz Schlüter, Kornwestheim, Wurttemberg, and Hilmar Schönemeyer, Ditzingen, Wurttemberg, Germany, assignors to International Standard Electric Corporation, New York, N.Y., a corporation of Delaware Filed Aug. 25, 1964, Ser. No. 396,791
Claims priority, application Germany, Aug. 27, 1963, St 21,017
U.S. Cl. 179—18 5 Claims
Int. Cl. H04m 3/00

ABSTRACT OF THE DISCLOSURE

A switching network includes several cascaded matrix stages of glass reed relays. End markings are applied to the network in order to establish switch paths through the successive stages. The idle crosspoints in the switch paths are selected on a guidewire basis. A combination of make-break contacts simultaneously hold the seized crosspoint and switch through the connection while disconnecting any attachments from the line. This saves the cost of cutoff relays required heretofore.

This invention relates to switching networks especially —although not exclusively—adapted for use in a telephone system and more particularly to reed relay networks.

Switching networks generally comprise a plurality of cascaded stages adapted to extend paths from an inlet, over one or more wires, to an outlet. At each switching stage, a control relay is usually coupled to the wires. For example, in a normal condition, the well known tip and ring wires of a telephone line generally connect to the winding of a line relay which is operated responsive to open or closed loop conditions on the line. These relays are used only during the establishment of the switch path. After the path is completed, the relays must be removed from their normal connection with the wires. Otherwise, the relay winding will short out the message currents which may be on the line. This connecting and disconnecting of the wires generally requires a number of components such as cut-off relays, for example. These components, in turn, increase the cost and complexity of the network.

Accordingly, an object of the invention is to reduce the cost of a switching network by eliminating the cut-off components. More particularly, an object is to simplify reed contact networks.

In keeping with an aspect of the invention, these and other objects are accomplished by a network having a plurality of reed relay contacts at each switching crosspoint. Some of the contacts switch the line conductors. Other of the contacts control the line cut-off function. Since a reed contact is a very low cost item, as compared with the over all cost of a relay, there is a considerable savings over the cost of conventional cut-off relays. This arrangement has a further advantage in that the switching reliability is increased because intermediate switching means are deleted and because the switching sequence is enforced.

The economical value of the invention is increased if, according to a further embodiment of the invention, a contact arrangement is used in which two contacts are associated with one reed armature. This construction means that more contacts are available without the necessity of modifying the size of the crosspoint element.

The above mentioned and other features of this invention and the manner of obtaining them will become more apparent, and the invention itself will be best understood by reference to the following description of an embodiment of the invention taken in conjunction with the accompanying drawings, in which.

Figure 1:
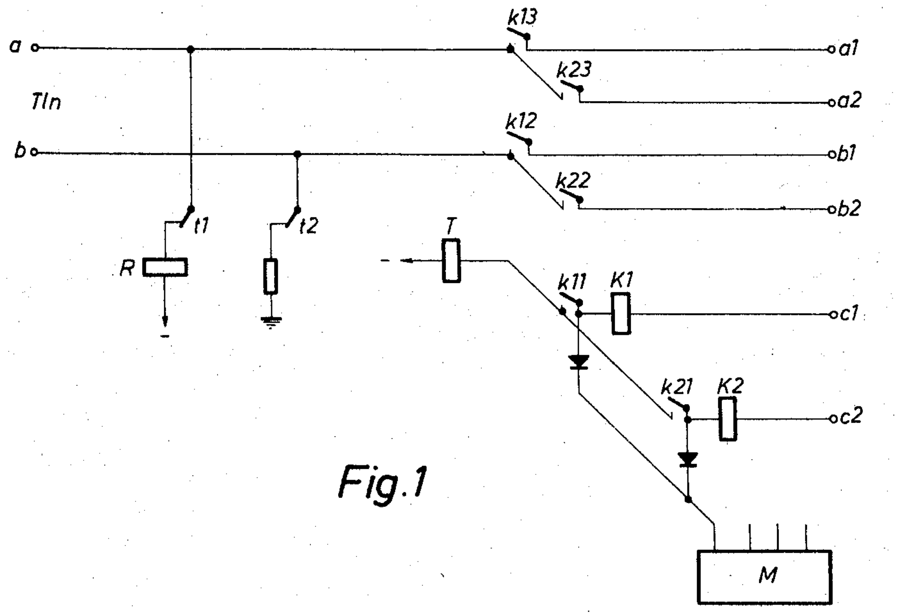
FIG. 1 shows a subscriber line circuit having a conventional first selector stage.

FIG. 1 shows a subscriber line circuit with a conventional first switching stage of the type using reed contacts. It is known to align a separate crosspoint multiple with each subscriber circuit. This keeps the number of crosspoints per subscriber line circuit small and obtains as homogeneous a primary matrix as possible.

In the representation of FIG. 1, the line relay R operates when the subscriber loop is closed across tip and ring conductors *a* and *b*. This relay initiates the establishment of a connection to an available register and to a power supply means, in one system. Other functions of a line relay are well known. Responsive to this relay operation, a ground potential is applied to one of the sleeve or *c*-wires ($c_1$ or $c_2$). This operates a single-stage or multi-stage switching grid. A crosspoint relay is energized with the marking of the marker M. If, for example, ground potential is applied to $c_1$, the crosspoint relay K1 operates. Relay K1 closes its holding circuit at contacts K11 and operates cut-off or disconnecting relay T, also at contact *k*11. The contacts K13, K12 through-connect the speech wires. Through its contacts *t*1 and *t*2, relay T disconnects any attachments which may be connected to the line during normal state conditions, such as the line relay R and an unnumbered resistor connected to contacts 12.

Means are provided for eliminating the cut-off relay T while improving the circuit reliability. According to the invention, this is done by special crosspoint contacts. In the example shown on FIG. 2, the connection is established at first as shown in FIG. 1. When the crosspoint relay K1 has operated, contact *k*11 closes its holding circuit. Before it through-connects the speech wires to the subscriber station through contacts *k*132 and *k*122, it disconnects all attachments, such as the line relay R and an unnumbered resistor, from the subscriber loop at break-contacts *k*131 and *k*121.

These break-contacts are arranged in a way such that the break-contact *k*121 is open when the make-contact *k*122 is closed. The contact *k*131 removes the potential from the *b*-wire when the make-contact *k*132 applies the same potential from the *a*1 wire so that there is no loss in continuity over the *a*-wire. The contacts *k*121 and *k*122 are arranged correspondingly.

If, in the supply unit, a negative potential is applied to the *a*-wire and ground potential to the *b*-wire (corresponding to the potential in the subscriber line circuit), the feed or bridge relay in the supply unit is energized when both wires are through-connected. This is why both potentials are disconnected in the subscriber line circuit.

Other break-contacts of the crosspoints (which through-connect other wires, e.g. the *z*-wire) can be used for other purposes such as indicating that the subscriber line is busy.

Figure 2:
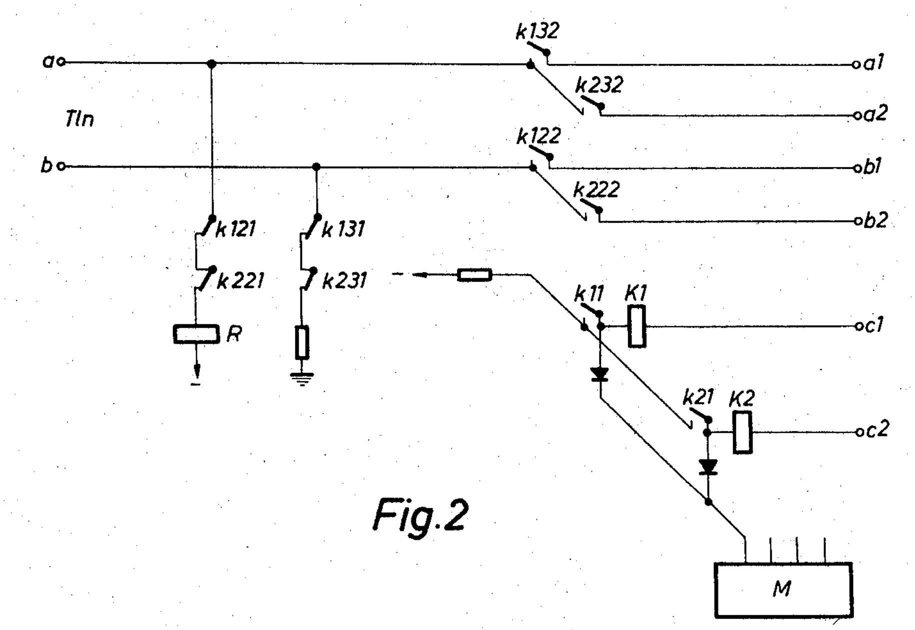
FIG. 2 shows a subscriber line circuit having a first selector stage made according to the invention.

By applying the invention, to the known arrangement, as shown at FIG. 2, the following advantages occur:

(1) It is more certain that the line relay R is switched off when the line is switched through-connected.

(2) It is certain that both speech wires are through-connected when a connection is established.

(3) No additional cut-off switching means is required to disconnect the line relay R from the subscribed line circuit.

Figure 3:
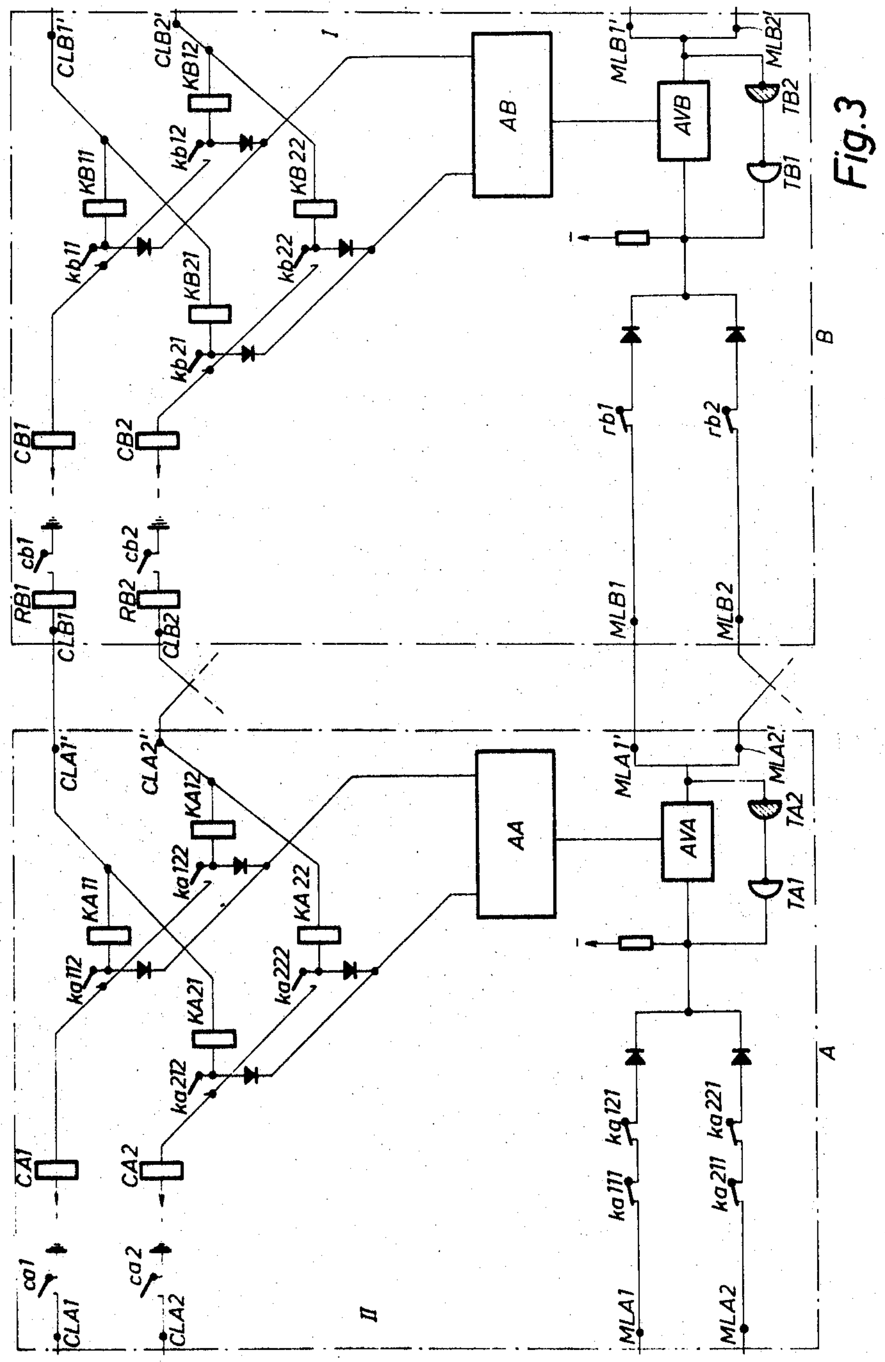
FIG. 3 shows two crosspoint multiples of which the crosspoint multiple B is constructed in the conventional manner and the crosspoint multiple A is constructed according to the invention.

FIG. 3 shows a further application of the invention. This figure shows the crosspoint multiples A and B of two successive switching stages. Only the *c*-wires (seizing wires) and the *m*-wires (route search wires) are here shown.

Other wires such as the voice wires may also be present. In the normal, or, a resting position, negative potential is constantly applied to all *m*-wires (MLB1′ and MLB2′), arriving from the direction I. The transistor TB2 is conductive, and the transistor TB1 cut-off. An offering signal is likewise applied to the wires MLB1 and MLB2. The offering signal is led in the same manner from the wires MLA1′ and MLA2′ via the crosspoint multiple A to the wires MLA1 and MLA2.

When a connection is to be established from the direction II into the direction I, an access signal of ground potential is applied from the direction II to I. Several, or all *m*-wires, advanced through the *m*-wire MLA1′ and MLB1 via the amplifier AVA. In the crosspoint multiple B, the *m*-wires MLB1′ and MLB2′ are extended via the offering amplifier AVB. We are not here concerned with how the crosspoint multiple is selected prior to advancing the access signal from the crosspoint multiple A to the crosspoint multiple B. Therefore, this aspect is not described in detail hereinafter.

Ground potential is applied from the direction I to a *c*-wire (CLB1′ or CLB2′). A crosspoint relay operates in the column marked by the selecting chain circuit AB. If, for example, ground potential is applied to CLB1′ and the selecting chain circuit AB has marked the column 1, the crosspoint relay KB11 is energized and closes its own holding circuit through contact *kb*11. Relay CB1 also operates through these contacts. Relay CB1 applies ground potential to the *c*-wire CLB1–CLA1′ through contact *cb*1. In the column marked by the selecting chain circuit AA, the crosspoint relay marked via conductor CLB1′, CLA1′ is operated. In series with the operated crosspoint relay, the relay RB1 is energized in the crosspoint multiple B. Through its contact *rb*1, it disconnects the *m*-wire MLB1–MLA1′ belonging to the *c*-wire CLB1–CLA1′, and in the route searching network, identifies this link line as being seized.

In the same way, the seizing would be indicated in the next succeeding crosspoint multiples, after the connection is through-connected via the respective crosspoint multiple.

The crosspoint multiple A is modified according to the invention as contrasted with the crosspoint multiple B which is known to the prior art. The above description for establishing a connection applies here too, with the exception that the identification of seizing is made in another manner. If, for example, the crosspoint relay KA11 is energized the aforedescribed two contacts in a reed switch are operated. The holding make-contact *ka*112 is inserted into the *c*-wire at the crosspoint relay KA11 and the break-contact *ka*111 is inserted in the *m*-wire MLA1. Similar contacts may be provided in the *a*-wire, *b*-wire, and *c*-wire which may be used with their respective break-contacts for further switching functions, such as checking of the selected route and supervision and which through-connect with their make-contacts the corresponding wires.

Before contact *ka*112 closes the holding circuit of the crosspoint relay KA11 and the operating circuit of relay CA1, contact *ka*111 marks the seizing *m*-wire MLB1 of the route searching network.

As shown in the crosspoint multiple A, the *c*-wire break-contacts of the crosspoint relays are series-inserted in one *m*-wire. The crosspoint relays are associated with the *c*-wire of the same link line or the terminating or outgoing line, respectively. If one of the crosspoint relays is through-connected (and only one can be through-connected) the pertinent *m*-wire is indicated as being seized.

Seizing can be indicated on either the terminating or on the outgoing end of a crosspoint multiple. It is only necessary to concentrate the crosspoint relays with their series-connected break-contacts aligned on the pertinent *c*-wires and to associate them with the corresponding *m*-wires.

The invention does not require that—as described in the example—the setting of a connecting path be made in stages. The setting of the connecting path is arbitrary and can be made, for example, simultaneously in all crosspoint multiples through which the connection is to be established.

The main advantages in applying the invention on marking in the route searching network are that no additional switching means need be used to mark the seizing in the route searching network. Consequently, there is a savings of space in the crosspoint arrangement. The seizing is marked before the connection is through-connected, consequently the reliability is increased and the possibility of erroneous twin connections reduced.

We claim:

1. A switching network comprising a plurality of guidewire conductors having attachments connected thereto during normal conditions, a plurality of reed contacts arranged as crosspoints in a switching grid, means comprising first reed contacts at each of said crosspoints for extending the one of said guidewire conductors which passes through that crosspoint to form a transmission line, and means comprising an extra set of contacts at each crosspoint for cutting-off any connections between said line and said attachments connected thereto.

2. The network arrangement according to claim 1 wherein said extra set of contacts are break contacts, and means whereby the normal condition potentials in a subscriber line circuit are disconnected from said line with the aid of the break-contacts.

3. The network arrangement according to claim 1 and a route searching network, means for disconnecting said searching network through operation of said extra set of contacts, in order to perform a seizing identification.

4. The network arrangement according to claim 1 wherein said extra set of contacts are break-contact forms, and said first contacts are in a make-contact form in a reed switch, said contacts operating in a break-make-contact-sequence.

5. The network arrangement according to claim 1 wherein each of said crosspoints has break-contacts and make-contacts arranged alternatingly in such a way that the break-contact associated with the through-connecting make-contact of one wire disconnects the potential from the other wire.

References Cited

UNITED STATES PATENTS

| | | | |
|---|---|---|---|
| 3,183,487 | 5/1965 | Deeg | 340—166 |
| 3,188,423 | 6/1965 | Glenner et al. | 340—166 X |
| 3,275,752 | 9/1966 | Esperseth et al. | 340—166 X |
| 3,286,234 | 11/1966 | Hogrefe | 340—166 |

JOHN W. CALDWELL, *Primary Examiner.*

HAROLD I. PITTS, *Assistant Examiner.*

U.S. Cl. X.R.

340—166